United States Patent [19]

Toyoda et al.

[11] Patent Number: 4,530,254
[45] Date of Patent: Jul. 23, 1985

[54] FASTENING DEVICE FOR TILTABLE STEERING ASSEMBLY

[75] Inventors: Shuhei Toyoda; Yuji Yokoya, both of Toyota; Hakumi Ishii, Okazaki, all of Japan

[73] Assignee: Toyota Jidosha Kabushiki Kaisha, Aichi, Japan

[21] Appl. No.: 530,245

[22] Filed: Sep. 8, 1983

[30] Foreign Application Priority Data

Sep. 9, 1982 [JP] Japan .................. 57-137143[U]

[51] Int. Cl.³ .............................................. B62D 1/18
[52] U.S. Cl. ........................................ 74/493; 74/540
[58] Field of Search ................................. 74/493, 540

[56] References Cited

U.S. PATENT DOCUMENTS

| 3,302,478 | 2/1967 | Pauwels | 74/493 |
| 3,355,962 | 12/1967 | Gerdes et al. | 74/493 |
| 3,365,976 | 1/1968 | Reed et al. | 74/493 |
| 3,421,386 | 1/1969 | Sippel | 74/493 |
| 4,102,218 | 7/1978 | Naka et al. | 74/493 |
| 4,279,176 | 7/1981 | Minamitani | 74/493 |
| 4,335,625 | 6/1982 | Nishikawa | 74/493 |
| 4,463,626 | 8/1984 | Kazaoka et al. | 74/493 |

FOREIGN PATENT DOCUMENTS 54-9365 4/1979 Japan.

Primary Examiner—Alan Cohan
Assistant Examiner—John A. Rivell
Attorney, Agent, or Firm—Parkhurst & Oliff

[57] ABSTRACT

In a fastening device for a tiltable steering assembly of the type in which the steering wheel can be tiltably adjusted into a number of selected driving positions in accordance with the driver's physique, the manual lever of the device is arranged to be moved upwardly to a predetermined angular position for effecting upward movement of the steering wheel into a remote position with respect to a pre-adjusted angular position and to be moved upwardly over the predetermined angular position for adjustment of the pre-adjusted angular position of the steering wheel. In the arrangement of the manual lever, the steering wheel is automatically returned to the pre-adjusted angular position and locked at the same position when depressed from the remote position.

8 Claims, 12 Drawing Figures

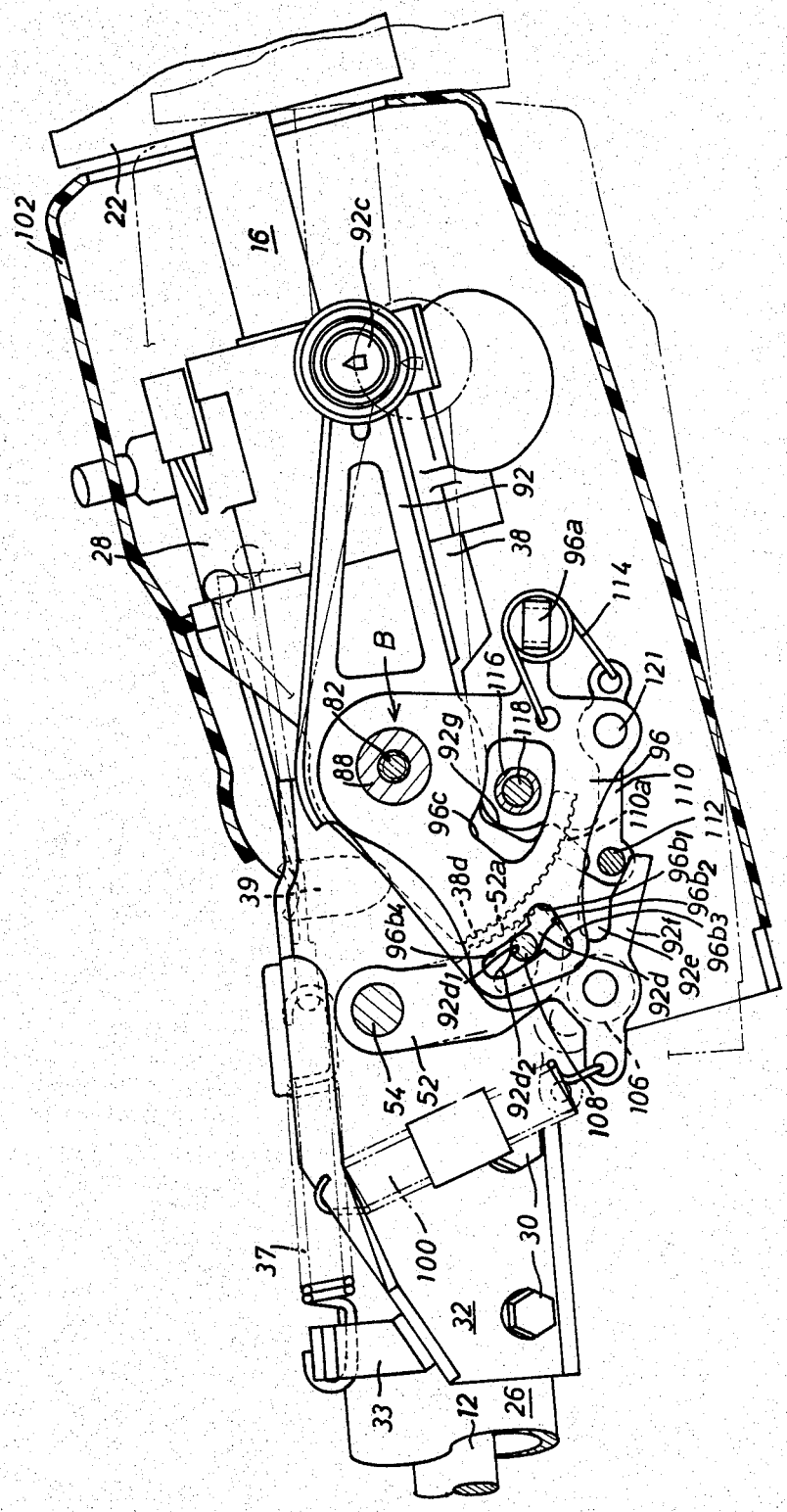

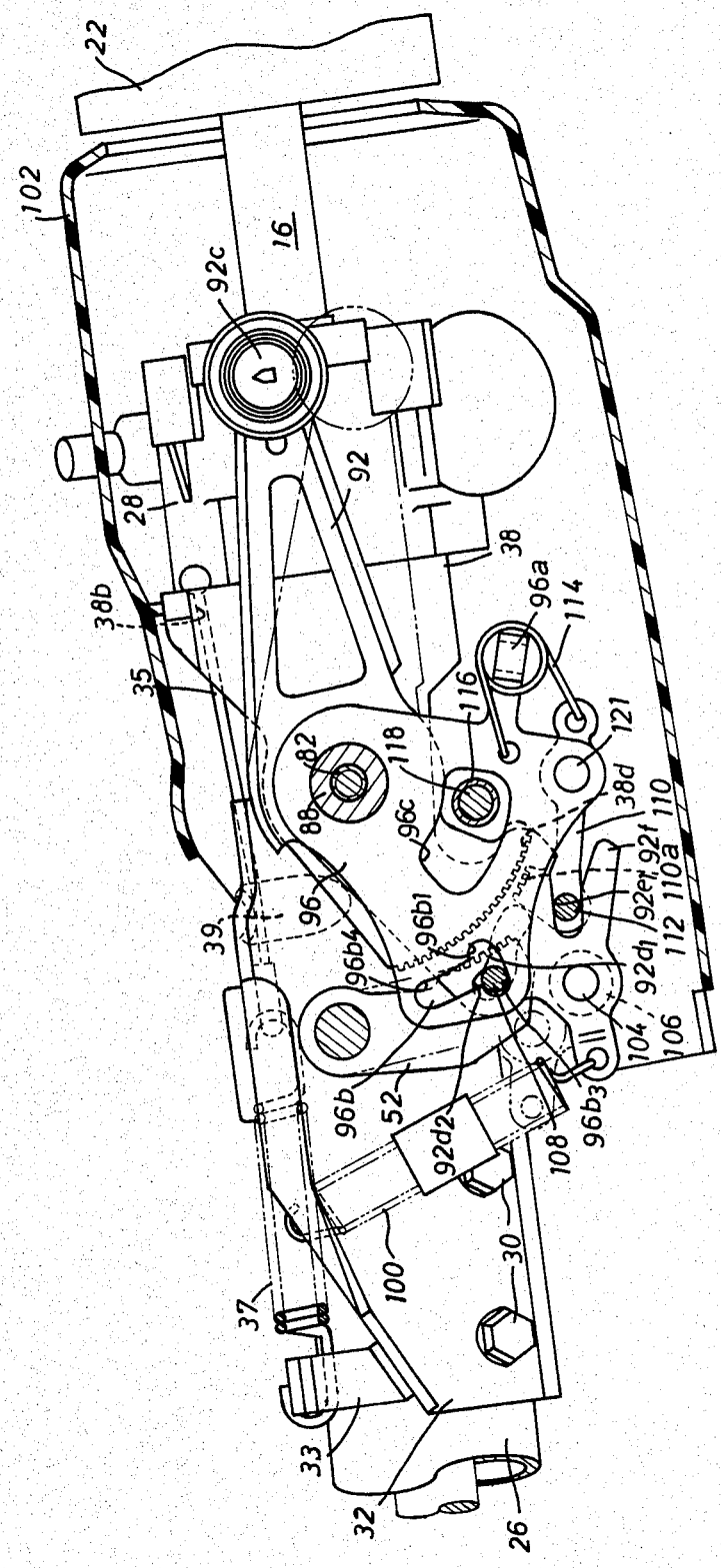

FASTENING DEVICE FOR TILTABLE STEERING ASSEMBLY

BACKGROUND OF THE INVENTION

The present invention relates to a tiltable steering assembly for automotive vehicles, and more particularly to an improvement of a fastening device for a tiltable steering assembly of the type in which the steering wheel can be tiltably adjusted into a number of operable driving positions in accordance with the driver's physique.

In U.S. Pat. No. 4,102,218 issued on July 25, 1978, a fastening device for a tiltable steering assembly has been proposed which comprises a stationary bracket mounted on the vehicle body structure, a movable bracket secured to a tubular housing and pivoted at its opposing arms to the stationary bracket for permitting angular adjustment of a tiltable steering shaft journalled within the tubular housing, a toothed portion integrally provided on one of the arms of the movable bracket, a latch member pivoted to a portion of the stationary bracket to be engaged with the toothed portion in the locked position, a manual lever pivoted to the stationary bracket coaxially with the movable bracket and operatively connected with the latch member to move the latch member toward the unlocked position, an engaging element provided on the manual lever and engageable with the latch member to hold the latch member in the locked position when the manual lever is released, and a spring for biasing the manual lever to maintain the engagement of the latch member with the toothed portion of the movable bracket. In use of the tiltable steering assembly, it is advantageous that the angular position of the steering wheel can be stepply adjusted to a desired driving position in such a way to give click feeling to the driver. It has, however, been necessitated to adjust the steering wheel to the desired driving position at each time when shifted into a remote position upwardly with respect to the pre-adjusted position to facilitate entry and exit of the driver into and out of the vehicle.

SUMMARY OF THE INVENTION

It is, therefore, a primary object of the present invention to provide an improved fastening device for a tiltable steering assembly of the type described above in which when shifted into a remote position upwardly from a pre-adjusted angular position, the steering wheel is automatically returned to the pre-adjusted angular position and locked at the same position only by depression of the steering wheel.

Another object of the present invention is to provide an improved fastening device for a tiltable steering assembly, having the above-mentioned characteristic, in which the manual lever of the fastening device is smoothly returned to its released position when the steering wheel is depressed to be returned to the pre-adjusted position.

According to the present invention, the foregoing objects are accomplished by a fastening device for a tiltable steering assembly including a steering shaft tiltably connected to steering gear means in an automotive vehicle, a tubular housing having the steering shaft journalled therein, and a steering wheel mounted on the steering shaft, which fastening device comprises a stationary bracket mounted on a portion of the vehicle body structure and having a pair of opposing arms, a movable bracket secured to the tubular housing and having a pair of opposing arms pivoted to the pair of arms of the stationary bracket for permitting angular adjustment of the steering wheel, one of the arms of the movable bracket being integrally provided with a toothed portion, and a latch member pivoted to a portion of the stationary bracket and movable between a locked position in which the latch member is in engagement with the toothed portion of said movable bracket to lock the steering wheel in a selected angular position and an unlocked position in which the latch member disengages from the toothed portion of the movable bracket to permit free movement for angular adjustment of the steering wheel, the latch member being integrally provided at a free end thereof with a lateral release pin. The fastening device further comprises a manual lever pivoted to the stationary bracket to be moved perpendicularly with respect to the pivot axis from its released position toward a predetermined angular position, the manual lever being provided at the lower end portion thereof with a cam slot in which the lateral release pin is located to move the latch member toward the unlocked position in response to movement of the manual lever toward the predetermined angular position and to move it toward the locked position in response to release of the manual lever, and the manual lever being further provided at the lower end portion thereof with a cam groove which is arranged to form a cam face, an engaging element in the form of a roller pivoted to the lower end of the manual lever to be engaged with the latch member when the manual lever is released and to be disengaged from the latch member when the manual lever is moved toward the predetermined angular position, a first spring for biasing the manual lever toward its released position to engage the engaging element with the latch member for effecting movement of the latch member toward the locked position and maintaining it in the locked position, and a second spring interconnected to the stationary and movable brackets to bias the steering wheel into a remote position upwardly with respect to the selected angular position.

The fastening device still further comprises a movable plate pivoted to the stationary bracket coaxially with the movable bracket and being provided with a second cam slot which is partially overlapped with the first-named cam slot to receive the lateral release pin therein, the second cam slot being in engagement with the lateral release pin in such a way to position the latch member in the locked position when the manual lever is released, to permit relative movement between the movable plate and the latch member when the manual lever is moved to and from the predetermined angular position, and to permit movement of the latch member toward the unlocked position and retain the movable plate in place when the manual lever is moved over the predetermined angular position, a second latch member pivoted to the movable plate and movable between a first position in which the second latch member is in engagement with the toothed portion of the movable bracket to connect the movable plate with the movable bracket and a second position in which the second latch member disengages from the toothed portion of the movable bracket to permit relative movement between the movable plate and the movable bracket, the second latch member being integrally provided with a second lateral release pin which is arranged to be engaged with the cam face of the manual lever for effecting movement of the second latch member toward the first position when the manual lever is in its released position and moved to and from the predetermined angular position and for effecting movement of the second latch member toward the second position when the manual lever is moved over the predetermined angular position, and a third spring mounted on a portion of the movable plate to bias the second latch member toward the first position.

In the fastening device described above, it is preferable that the first-named cam slot in the manual lever includes an oblique slot portion arranged to extend upwardly from the first-named lateral release pin in a direction apart from the pivot of the movable bracket when the first-named latch member is in the locked position, and a circumferentially extending slot portion extending upwardly from the oblique slot portion and being defined about a center located at the pivot of the movable bracket. It is also preferable that the second-named cam slot in the movable plate includes a first circumferentially extending cam slot portion defined about a center located at the pivot of the first-named latch member and a second circumferentially extending cam slot portion defined about a center located at the pivot of the movable bracket.

BRIEF DESCRIPTION OF THE DRAWINGS

Further and more specific objects, features and advantages of the present invention and the manner in which the invention is carried into practice are made apparent in the following detailed description wherein reference is made to the accompanying drawings, in which:

FIG. 10 is an enlarged side view of the tiltable steering assembly conditioned in its unlocked position for shifting the steering wheel into a remote position upwardly;

FIG. 11 is an enlarged side view of the tiltable steering assembly in its unlocked position for angular adjustment of the steering wheel.

DETAILED DESCRIPTION OF THE PREFERRED EMBODIMENTS

Figure 1:
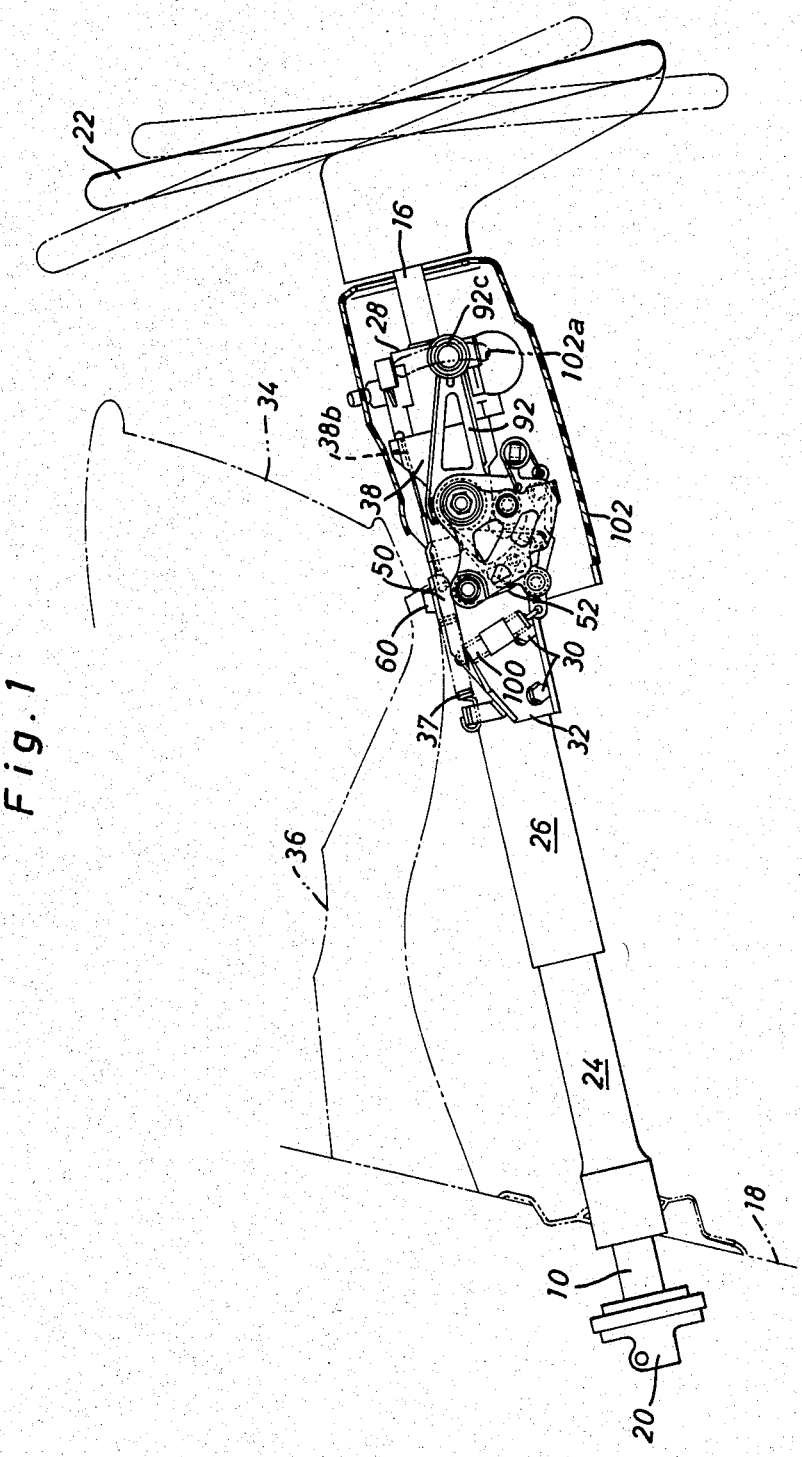
FIG. 1 is a side view of a preferred embodiment of a tiltable steering assembly for automotive vehicles in accordance with the present invention.
Figure 2:
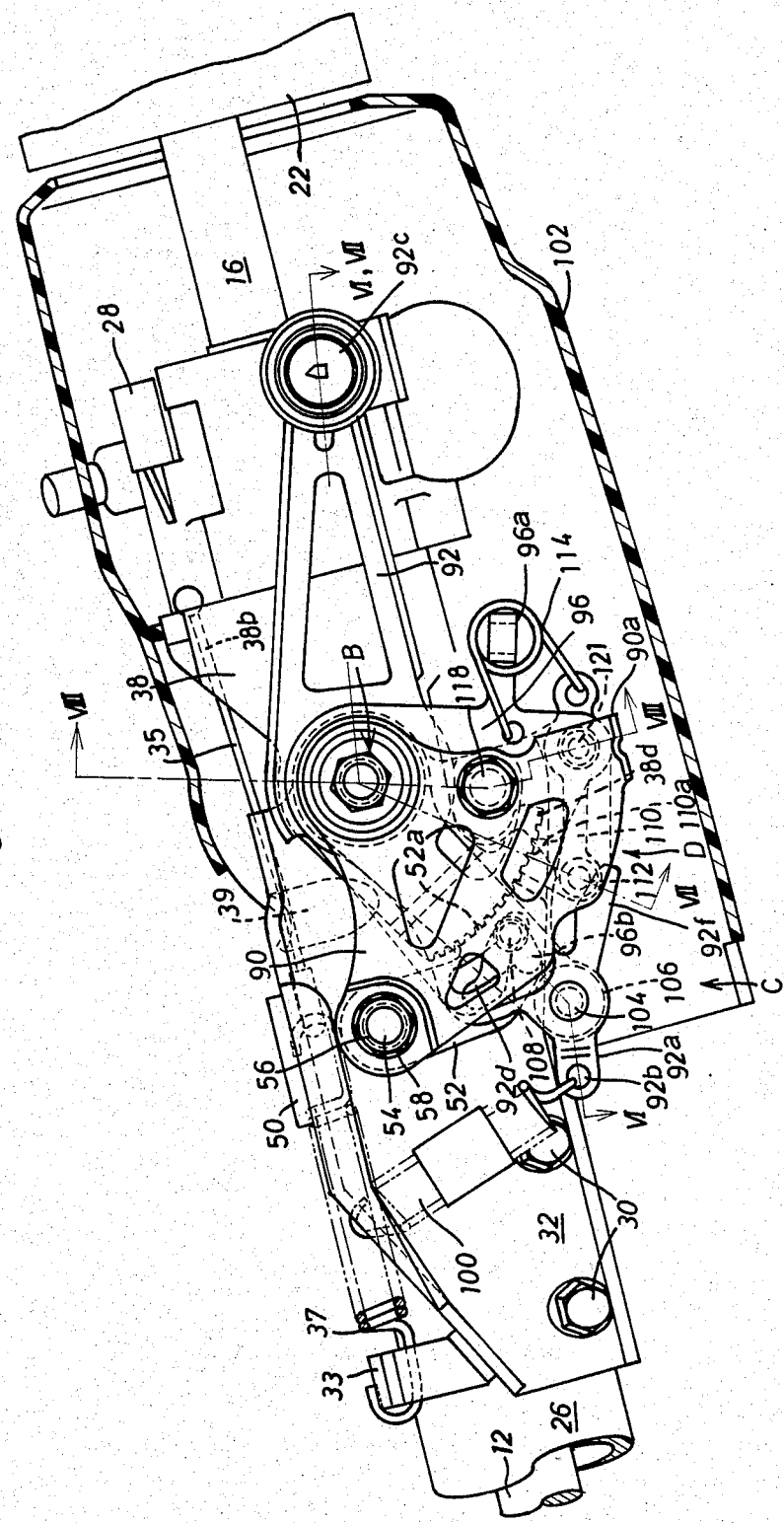
FIG. 2 is an enlarged side view of a portion of the tiltable steering assembly shown in FIG. 1.
Figure 3:
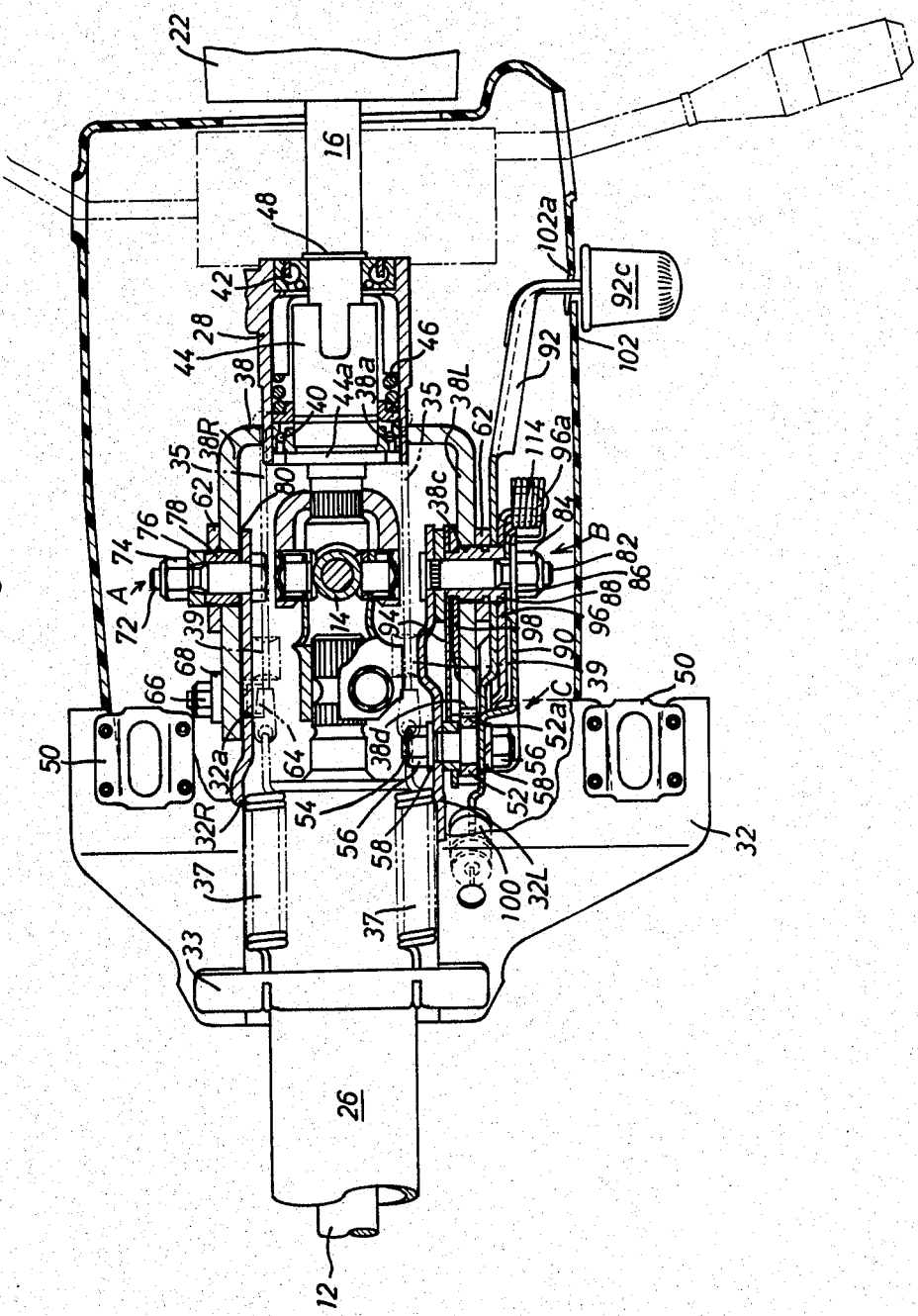
FIG. 3 is a partially broken and enlarged plan view of a portion of the tiltable steering assembly shown in FIG. 1.

Referring now to the drawings, particularly in FIGS. 1-3 there is illustrated a steering shaft assembly which includes a lower tubular shaft 10, a middle shaft 12 connected to shaft 10, and an upper shaft 16 connected to shaft 12 through a universal joint 14. The lower shaft 10 extends outwardly through a toe board 18 of the vehicle compartment and is connected at its lower end to a steering gear means (not shown) through a flexible coupling 20. The upper portion of shaft 10 has a rectangular cross-section and is connected to the lower portion of shaft 12 in an axially slidable and torque transmissible way. A steering wheel 22 is fixedly mounted on the upper end of shaft 16.

A column tube assembly includes first, second and third tubular housings 24, 26 and 28. The first tubular housing 24 contains therein the lower shaft 10 and is anchored at its lower end to the toe board 18. The upper portion of tubular housing 24 is coupled with the second tubular housing 26 through an impact energy absorbing means. The second tubular housing 26 contains therein the middle shaft 12 and is supported by a stationary bracket 36 by way of a stationary bracket 32 which is secured on the upper outer periphery of tubular housing 26 by fastening bolts 30. The stationary bracket 36 is fixedly mounted on the toe board 18 under an instrument panel 34 of the vehicle body. The third tubular housing 28 is secured at its lower end to a movable bracket 38 by fastening bolts (not shown), which bracket 38 is pivoted to the stationary bracket 32, as described later in detail. Within the third tubular housing 28, the upper steering shaft 16 is rotatably supported by way of a pair of bearings 40 and 42, and a key lock holder 44 is secured to the upper steering shaft 16 to be engaged with a manually operated key lock bar (not shown). In this arrangement, a stepped portion 44a of holder 44, a compression coil spring 46 and a retainer ring 48 are assembled to position in place the upper steering shaft 16 between bearings 40 and 42.

Figure 4:
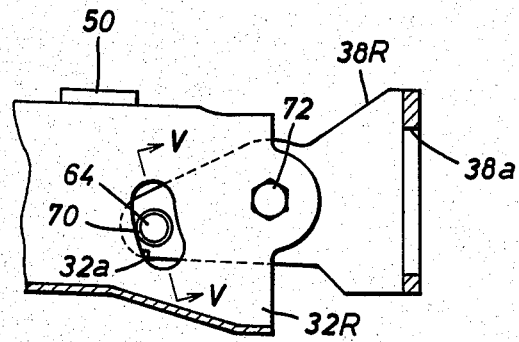
FIG. 4 is a partially enlarged side view illustrating a pivot portion of the stationary and movable brackets shown in FIG. 3.
Figure 5:
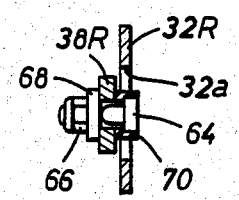
FIG. 5 is a cross-sectional view taken along line V—V in FIG. 4.

The stationary bracket 32 includes a U-shaped body portion with a pair of lateral flanges and a pair of vertical arms 32L, 32R extending upwardly from the body portion. The lateral flanges of bracket 32 are provided thereon with a pair of breakable capsules 50, 50 to be secured under the stationary bracket 36. Pivoted on the left arm 32L of bracket 32 is a latch member 52 by means of a lateral pin 54, a pair of nuts 56, 56 and a pair of washers 58, 58 to be moved up and down., As can be well seen in FIGS. 4 and 5, the right arm 32R of bracket 32 is provided with a circumferetially extending slot 32a. Thus, the stationary bracket 32 is secured through capsules 50, 50 to the stationary bracket 36 by bolts 60 and nuts fastened thereto to be movable forwardly, and the second tubular housing 26 is fixedly supported by the body portion of bracket 32.

As can be well seen in FIG. 3, the movable bracket 38 is formed in a U-shape and has a through hole 38a for support of the third tubular housing 28 and a pair of spring receiver holes 38b, 38b (shown in FIGS. 1 and 2). A pair of arms 38R, 38L of bracket 38 are respectively provided with an annular spacer 62 secured thereto and with a lateral hole 38c corresponding to the spacer 62. The left vertical arm 38L of bracket 38 is provided at the free end thereof with a toothed portion 38d in the form of a sector gear to be engaged with the latch member 52, as is illustrated in FIGS. 2 and 3. As can be well seen FIGS. 4 and 5, the right vertical arm 38R of bracket 38 is integrally provided at the free end thereof with a stopper bolt 64 which is inserted into the circumferentially extending slot 32a of stationary bracket 32 to restrict rotary movement of the movable bracket 38 in a predetermined angle. The stopper bolt 64 is secured to the free end of arm 38R by means of a fastening nut 66 through a washer 68 and has an annular cushion rubber 70 secured thereto. The movable bracket 38 is assembled with the stationary bracket 32 in such a manner that the arms 38R, 38L of bracket 38 overlap the arms 32R, 32L of bracket 32. Thus, the arms 38R, 38L of bracket 38 are respectively pivoted to the arms 32R, 32L of bracket 32 by means of right and left pivot means A and B.

As can be well seen in FIG. 3, the right pivot means A comprises a lateral pivot bolt 72, a lock nut 74, a washer 76, a sintered metal bush 78 with a spherical face, and a spacer 80 made of a spring steel plate. The pivot bolt 72 is inserted through a pivot hole of the right arm 32R and the spacer 80 into the metal bush 78 which is retained within the pivot hole 38c of right arm 38R, and the lock nut 74 is fastened on the outer end of pivot bolt 72 through washer 76. Thus, the metal bush 78 and spacer 80 are fixed in place so that the right arm 38R of movable bracket 38 can be tilted around the spherical face of bush 78 in the vertical direction. As can be well seen in FIGS. 3, 6, 7 and 8, the left pivot means B comprises a lateral pivot bolt 82, a lock nut 84, a washer 86, a sintered metal bush 88 with a spherical face and a pair of bearing portions. The pivot bolt 82 is inserted through the left arm 32L of bracket 32 and a reinforcement plate 90 into the metal bush 88 which is retained within the pivot hole 38c of left arm 38L, and the lock nut 84 is fastened on the outer end of pivot bolt 82 through washer 86. Thus, the washer 86, the reinforcement plate 90, and the metal bush 88 are fixed in place so that the left arm 38L of movable bracket 38 can be tilted around the spherical face of metal bush 88 in the vertical direction. In this pivot means B, a manual lever 92, a reinforcement plate 94 for lever 92, a movable plate 96, and a reinforcement plate 98 for plate 96 are rotatably assembled on the pair of bearing portions of metal bush 88.

With the above-described pivot means A and B, each axis of the lateral pivot bolts 72 and 82 is aligned on a horizontal common axis passing through the center of universal joint 14. During the assembling process, even if the pivot bolts 72, 82 may not be aligned on the common axis, the movable bracket 38 can be assembled with the stationary bracket 32 owing to spherical guides of the respective metal bushes 78 and 88.

Assembled on the left side of the brackets 32, 38 is a fastening device C which is provided with a mechanical memory mechanism described in detail later. In the fastening device C, the latch member 52 is operatively connected to the manual lever 92 to be selectively engaged with the toothed portion 38d of movable bracket 38. The manual lever 92 is formed in a shape illustrated in FIG. 9 and is rotatable on the outer bearing portion of metal bush 88 perpendicularly with respect to the horizontal common axis. The manual lever 92 is biased clockwisely by a tension coil spring 100 which is engaged at its one end with a hole 92b in a lower arm 92a of lever 92 and at its other end with a portion of stationary bracket 32. As is illustrated in FIG. 3, the upper portion of manual lever 92 extends outwardly through a part circumferentially extending slot 102a of a column cover 102 and is provided thereon with a grip 92c. The slot 102a is defined about a center located at the left pivot means B as is illustrated by an imaginary line in FIG. 1. The manual lever 92 is further provided on the lower end thereof with a lateral pin 104 which is secured at its both ends to the manual lever 92 and the reinforcement plate 94. Between the manual lever 92 and the reinforcement plate 94, a roller 106 is journalled on the lateral pin 104 to be engaged with the bottom face of latch member 52. When the manual lever 92 is in its locked position as shown in FIG. 2, the roller 106 is in engagement with the bottom face of latch member 52 under tension of the return spring 100 to hold engagement of the latch member 52 with the toothed portion 38d of movable bracket 38.

Figure 9:
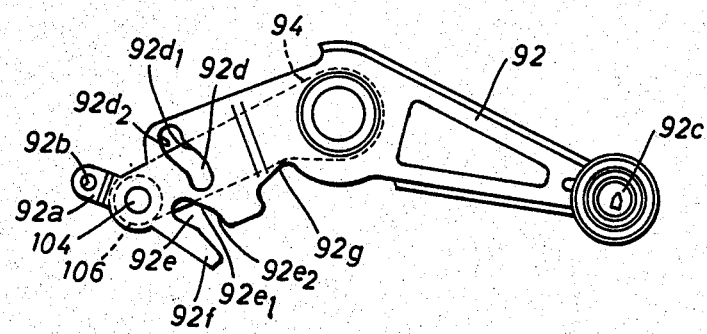
FIG. 9 is a side view of the manual lever illustrated in FIG. 2.

As can be well seen in FIG. 9, the manual lever 92 is further provided at its lower portion with a cam slot 92d in which a release pin 108 secured to latch member 52 is inserted. When the manual lever 92 is moved counterclockwisely against tension of return spring 100 to a predetermined angular position, the roller 106 is separated from the latch member 52 and subsequently the release pin 108 of latch member 52 is moved clockwisely by engagement with the inside face of cam slot 92d, resulting in disengagement of the latch member 52 from the toothed portion 38d of movable bracket 38. (see FIG. 10) As can be well seen in FIGS. 9–12, the cam slot 92d includes an oblique portion $92d_1$ and a circumferential portion $92d_2$ extending upwardly from oblique portion $92d_1$. When the latch member 52 is in engagement with the toothed portion 38d of movable bracket 38, the oblique portion $92d_1$ of cam slot 92d is arranged to extend upwardly from the release pin 108 of latch member 52 in a direction apart from the pivot of brackets 32, 38. The circumferential portion $92d_2$ of cam slot 92d is defined about a center located at the pivot of brackets 32, 38. When the manual lever 92 is moved counterclockwisely to the predetermined angular position, the oblique portion $92d_1$ of cam slot 92d acts to move the release pin 108 of latch member 52 clockwisely by engagement therewith. When the manual lever 92 is further moved counterclockwisely over the predetermined angular position, the circumferential portion $92d_2$ of cam slot 92d receives the release pin 108 of latch member 52 therein.

Furthermore, the manual lever 92 is provided at its lower portion with a cam groove 92e which is arranged to receive a second release pin 112 therein. The release pin 112 is fixed to the free end of a second latch member 110 described in detail later. When the manual lever 92 is counterclockwisely to the predetermined angular position, the second release pin 112 is freely guided by a circumferential inside face $92e_1$ of cam groove 92e to remain the latch member 110 in its engaged position with the toothed portion 38d of movable bracket 38. When the manual lever 92 is further moved counterclockwisely over the predetermined angular position, the second release pin 112 is moved counterclockwisely by engagement with an inside cam face $92e_2$ of cam groove 92e to effect disengagement of the latch member 110 from the toothed portion 38d of movable bracket 38. The manual lever 92 is further provided at its lower portion with a stopper arm 92f which is arranged to restrict counterclockwise movement of the second release pin 112 so as to prevent disengagement of the latch member 110 from the toothed portion 38d of movable bracket 38 caused by vibration. The manual lever 92 is formed at its intermediate portion with a stopper face 92g which is arranged to be engaged with a collar 116 to restrict the maximum angular movement of the manual lever 92.

Figure 7:
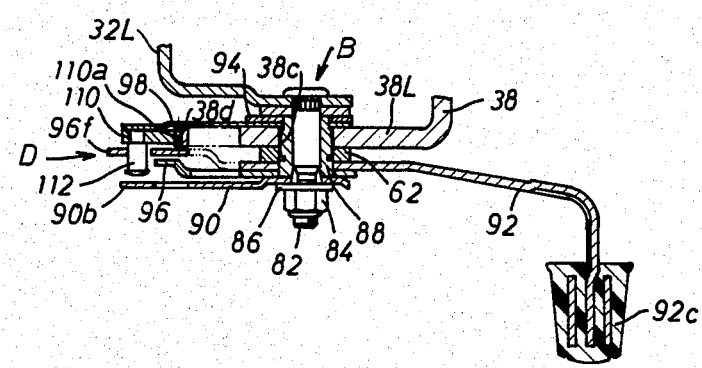
FIG. 7 is a cross-sectional view taken along line VII—VII in FIG. 2.
Figure 8:
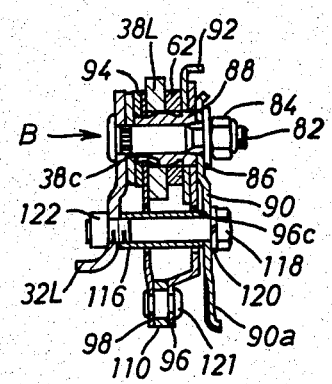
FIG. 8 is a cross-sectional view taken along line VIII—VIII in FIG. 2.
Figure 12:
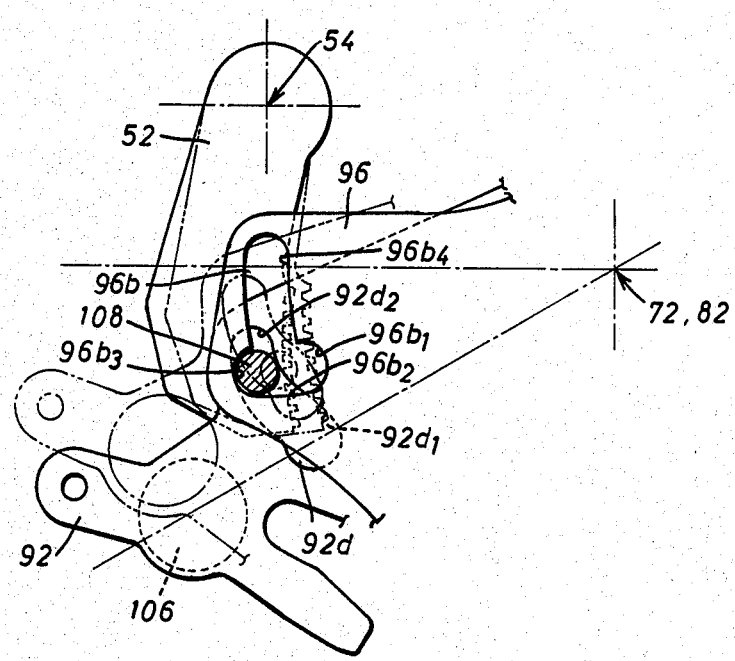
FIG. 12 is a schematic illustration of cam means in the fastening device shown in FIGS. 2, 10 and 12.

As can be well seen in FIGS. 2, 3 and 8, the reinforcement plate 90 is located at the outside of the manual lever 92 and movable plate 96. The reinforcement plate 90 is fixed at its rear portion to the stationary bracket 32 by means of the left pivot means B and fixed at its lower portion to the stationary bracket 32 by means of a bolt 118, a washer 120, the collar 116 and a nut 122 secured to the inside face of bracket 32. The reinforcement plate 90 is further fixed at its front upper portion to the stationary bracket 32 by means of nuts 56, 56, washers 58, 58 and a pin 54. (see FIG. 3) The reinforcement plate 90 is formed at its lower end with a lateral flange 90a which is located to protect the movable plate 96 during the assembling process of the mechanical memory mechanism D. As can be well seen in FIGS. 6 and 7, a portion of reinforcement plate 90 is also located as a stopper plate for the release pins 108 and 112.

Figure 6:
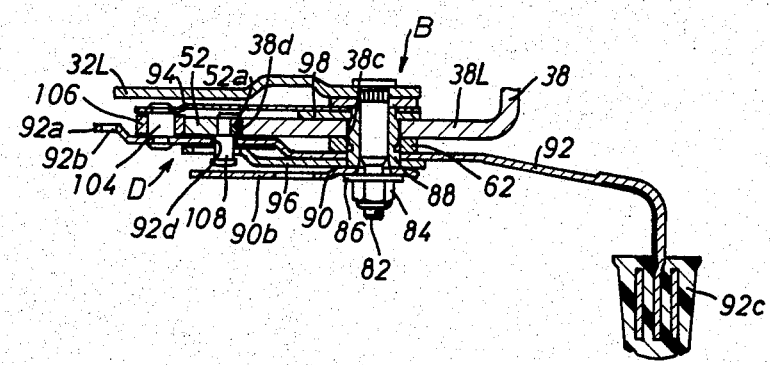
FIG. 6 is a cross-sectional view taken along line VI—VI in FIG. 2.

As can be well seen in FIGS. 2, 6 and 7, the mechanical memory mechanism D is arranged at the inside of reinforcement plate 90. In this arrangement, the main component parts of the memory mechanism D are the movable plate 96, and the latch member 110 in engagement with the toothed portion 38d of movable bracket 38 under biasing force of a torsion spring 114. As can be well seen in FIGS. 10–12, the movable plate 96 is rotatably mounted on the outer bearing portion of bush 88 in the left pivot means B, and the latch member 110 is pivoted to the lower portion of movable plate 96 by means of a pin 121. The lower portion of movable plate 96 is integrally formed with a spring holder 96a on which the torsion spring 114 is supported in place. The spring 114 is engaged at its one end with a portion of movable plate 96 and at its other end with the rear end of latch member 110 to bias the latch member 110 clockwisely for engagement with the toothed portion 38d of movable bracket 38. As can be well seen in FIGS. 10–12, the movable plate 96 is formed with an approximately T-shaped cam slot 96b which is partially overlapped with the cam slot 92d of manual lever 92 to receive the release pin 108 of latch member 52 therein. The cam slot 96b includes a first circumferentially extending cam slot portion $96b_1$–$96b_3$ defined about a center located at the pivot 54 of latch member 52, and a second circumferentially extending cam slot portion $96b_4$ defined about a center located at the pivot 82 of movable bracket 38 and extending upwardly from an interim $96b_2$ of the first cam slot portion. When the manual lever 92 is moved counterclockwisely to the predetermined angular position, the first cam slot portion $96b_1$–$96b_3$ cooperates with the oblique portion $92d_1$ of cam slot 92d to permit the clockwise movement of release pin 108 from the inner end $96b_1$ of the first cam slot portion to the interim $96b_2$ of the same. Under such a condition, the second cam slot portion $96b_4$ is located to receive the release pin 108 therein. When the manual lever 92 is further moved counterclockwisely over the predetermined angular position, the first cam slot portion $96b_1$–$96b_3$ cooperates with the cam slot 92d of manual lever 92 to permit the clockwise movement of release pin 108 to the outer end $96b_3$ of the first cam slot portion. Furthermore, the movable plate 96 is provided with a circumferentially elongated opening 96c to avoid interference with collar 116.

As can be well seen FIGS. 2 and 3, the movable bracket 38 is biased upwardly against the stationary bracket 32 by a pair of tension coil springs 37, 37 which are engaged at their one ends with a hood 33 secured to flanges of stationary bracket 32 and engaged at their other ends with the upper portion of movable bracket 38 through spring receiver holes 38b, 38b.

Hereinafter the operation of the tiltable steering assembly will be described with reference to FIGS. 2, 10, 11 and 12. When the fastening device C is in its locked position, the grip 92c of manual lever 92 is located at the downward position and the roller 106 is in engagement with the bottom face of latch member 52 under biasing force of spring 100 to maintain the engagement of latch member 52 with the toothed portion 38d of movable bracket 38. Thus, the movable bracket 38 is locked at a selected angular position with respect to the stationary bracket 32 against upward biasing force of coil springs 37, 37. Under such a condition, the upper shaft 16 supported by the third tubular housing 28 is fixedly held at a selected angle with respect to the middle shaft 12 so that the steering wheel 22 is held at a desired angle with respect to the driver. It is also noted that the release pin 108 of latch member 52 is located at the lower end of cam slot 92d in manual lever 92 and at the inside $96b_1$ of the first cam slot portion in movable plate 96. (see FIG. 2).

When it is desired to shift the steering wheel 22 upwardly out of the plane of its pre-selected angular position for facilitating entry and exit of the driver into and out of the vehicle, the grip 92c of manual lever 92 is moved upwardly or counterclockwisely against return spring 100. Then, as described previously, the roller 106 is separated from the bottom face of latch member 52, and subsequently the release pin 108 of latch member 52 is moved clockwisely by engagement with the oblique portion $92d_1$ of cam slot 92d in manual lever 92, resulting in disengagement of the latch member 52 from the toothed portion 38d of movable bracket 38. Thus, the movable bracket 38 is released from the stationary bracket 32 and tends to move upwardly under the biasing force of tension springs 37, 37. At the initial stage of the upward movement of manual lever 92, the second latch member 110 is in engagement with the toothed portion 38d of movable bracket 38, and the movable plate 96 is still in engagement with the release pin 108 of latch member 52 at the inside $96b_1$ in its first cam slot portion to restrict the upward movement of movable bracket 38. When the manual lever 92 is moved upwardly to the predetermined angular position, the release pin 108 of latch member 52 is disengaged from the inside $96b_1$ of the first cam slot portion and located at the interim $96b_2$ of the same. As a result, the second cam slot portion $96b_4$ in movable plate 96 is located to receive the release pin 108 therein so as to permit counterclockwise movement of movable plate 96 relative to latch member 52. (see FIGS. 10 and 12) This moves upwardly the steering wheel 22 into a remote position with respect to the preselected driving position under the biasing force of tension springs 37, 37. In this instance, the upward movement of movable bracket 38 is restricted by engagement of the stopper bolt 64 against the lower end of slot 32a in the right arm 32R of stationary bracket 32.

When the manual lever 92 is released after the movable bracket 38 is released, the roller 106 is brought into engagement with the bottom face of latch member 52 under the biasing force of return spring 100, and the release pin 108 of latch member 52 is retained in its unlocked position by engagement with the second cam slot portion 96b₄ in movable plate 96 to restrict counterclockwise movement of latch member 52. (see FIG. 10) Thus, the latch member 52 is retained in the position disengaged from the toothed portion 38d of movable bracket 38, and the steering wheel 22 is remained in the remote position to be freely moved downwardly against the biasing force of tension springs 37, 37.

When the driver moves down the steering wheel 22 after entry into the vehicle, the movable plate 96 united with bracket 38 through latch member 110 is moved to the pre-selected angular position of movable bracket 38, and the release pin 108 of latch member 52 is disengaged from the second cam slot portion 96b₄ in movable plate 96 to be moved toward the inside 96b₁ of the first cam slot portion in the same. As a result, the latch member 52 is moved counterclockwisely by engagement with the roller 106 under the biasing force of return spring 100 and engaged with the toothed portion 38d of movable bracket 38. Thus, the fastening device C is locked at the same position as previously locked, and the steering wheel 22 is fixed in its pre-selected angular position. If in the above operation the manual lever 92 is depressed with great force, the release pin 108 of latch member 52 will abut against the interim 96b₂ of the first cam slot portion in movable plate 96 to ensure the engagement of latch member 52 with the toothed portion 38d of movable bracket 38 at the pre-selected position. During the above operation, the release pin 112 of latch member 110 does not engage the cam face 92e₁ of cam groove 92e in manual lever 92 to maintain the engagement of latch member 110 with the toothed portion 38d of movable member 38. From the above description, it will be noted that the steering wheel 22 can be shifted up toward the remote position only by operation of the manual lever 92 and returned to the preselected angular position only by depression of the steering wheel.

When it is desired to adjust the pre-selected angular position of the steering wheel 22 in accordance with the driver's physique, the grip 92c of manual lever 92 is pushed up by the driver's left hand over the predetermined angular position against return spring 100, while the steering wheel 22 is held by the driver's right hand against tension springs 37, 37 to maintain the movable bracket 38 in its pre-selected angular position. Then, the roller 106 is separated from the bottom face of latch member 52, and subsequently the release pin 108 of latch member 52 is moved clockwisely by engagement with the oblique portion 92d₁ of cam slot 92d in manual lever 92 to be located at the circumferentially extending portion 92d₂ of the same, resulting in disengagement of the latch member 52 from the toothed portion 38d of movable bracket 38. Simultaneously, the release pin 108 of latch member 52 is separated from the inside 96b₁ of the first cam slot portion in movable plate 96 to be displaced to the outside 96b₃ of the same. (see FIGS. 11 and 12) Meanwhile, the release pin 112 of latch member 110 is moved counterclockwisely by engagement with the cam face 92e₁ of cam groove 92e in manual lever 92 against torsion spring 114, resulting in disengagement of the latch member 110 from the toothed portion 38d of movable bracket 38. When the release pin 108 of latch member 52 is located at the circumferentially extending portion 92d₂ of cam slot 92d and at the outside 96b₃ of the first cam slot portion in movable plate 96, the latch member 52 is retained in its disengaged position, and the movable plate 96 is fixed in place. Thus, the movable bracket 38 is released from the stationary bracket 32, and the steering wheel 22 can be freely tilted downwardly or upwardly to a desired angular position. In this instance, the upper shaft 16 is correspondingly tilted around universal joint 14, and the movable bracket 38 is also tilted around the pivot means A and B.

When the manual lever 92 is released after adjustment of the steering wheel 22 to the desired angular position, the release pin 112 of latch member 110 is disengaged from the cam face 92e₁ of cam groove 92e in response to clockwise movement of manual lever 92 to effect engagement of the latch member 110 with the toothed portion 38d of movable bracket 38 under the biasing force of torsion spring 114, and subsequently the release pin 108 of latch member 52 is disengaged from the circumferentially extending portion 92d₂ of cam slot 92d in manual lever 92. Then, the latch member 52 is moved toward the toothed portion 38d of movable bracket 38 by engagement with the roller 106, and the release pin 108 of latch member 52 is displaced from the outer end 96b₃ of the first cam slot portion in movable plate 96 to the inner end of the same to effect engagement of the latch member 52 with the toothed portion 38d of movable bracket 38. Thus, the fastening device C is locked to fixedly support the steering wheel 22 at the adjusted angular position with respect to the driver. Under such a locked condition of the fastening device C, each engagement of the latch members 52, 110 with the toothed portion 38d of movable bracket 38 is effected at a position corresponding to the adjusted angular position of the steering wheel 22.

In the preferred embodiment described above, the manual lever 92 is arranged to be moved upwardly to the predetermined angular position for shifting the steering wheel 22 upwardly out of the plane of its preselected angular position and is further arranged to be moved upwardly over the predetermined angular position for adjusting the pre-selected angular position of the steering wheel 22. In this arrangement, it is required to provide a predetermined rotary stroke in operation of the manual lever 92 between the upward positions thereby to enhance the operational feel of manual lever 92. For the above reason, as can be well seen in FIG. 12, the oblique 92d₁ of cam slot 92d is arranged to extend upwardly from the release pin 108 of latch member 52 in the direction apart from the pivot 82 of brackets 32, 38 under engagement of the latch member 52 with the toothed portion 38d of bracket 38 for effecting clockwise movement of the release pin 108, and the circumferentially extending portion 92d₂ of cam slot 92d is defined about a center located at the pivot 82 of brackets 32, 38 to permit relative rotary movement between the manual lever 92 and the release pin 108. With the arrangement of cam slot 92d in relation to the cam slot 96b in movable plate 96, the release pin 108 of latch member 52 is received by the circumferentially extending portion 92d₂ of cam slot 92d in operation of the manual lever 92 over the predetermined angular position and retained at the outer end 96b₃ of the first cam slot portion in movable plate 96 without undesired press-fit to ensure smooth return movement of the manual lever 92 under the biasing force of return spring 100.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a fastening device for a tiltable steering assembly including a steering shaft tiltably connected to steering gear means in an automotive vehicle, a tubular housing having said steering shaft journalled therein, and a steering wheel mounted on said steering shaft, said fastening device comprising:

a stationary bracket mounted on a portion of the vehicle body structure and having a pair of opposing arms;

a movable bracket secured to said tubular housing and having a pair of opposing arms pivoted to the pair of arms of said stationary bracket for permitting angular adjustment of said steering wheel, one of the arms of said movable bracket being integrally provided with a toothed portion;

a latch member pivoted to a portion of said stationary bracket and movable between a locked position in which said latch member is in engagement with the toothed portion of said movable bracket to lock said steering wheel in a selected angular driving position and an unlocked position in which said latch member disengages from the toothed portion of said movable bracket to permit free movement for angular adjustment of said steering wheel;

a manual lever pivoted to said stationary bracket to be moved perpendicularly with respect to the pivot axis from its released position toward a predetermined angular position;

an engaging element provided on said manual lever to be engaged with said latch member when said manual lever is released and to be disengaged from said latch member when said manual lever is moved toward the predetermined angular position;

first resilient means for biasing said manual lever toward its released position to engage said engaging element with said latch member for effecting movement of said latch member toward the locked position and maintaining it in the locked position;

second resilient means interconnected to said stationary and movable brackets to bias said steering wheel into a remote position upwardly with respect to the selected angular driving position;

cam means for effecting movement of said latch member toward the unlocked position when said manual lever is moved to the predetermined angular position and for effecting movement of said latch member toward the locked position when said manual lever is released;

the improvement comprising:

a movable plate pivoted to said stationary bracket coaxially with said movable bracket;

a second latch member pivoted to said movable plate and movable between a first position in which said second latch member is in engagement with the toothed portion of said movable bracket to connect said movable plate with said movable bracket and a second position in which said second latch member disengages from the toothed portion of said movable bracket to permit relative movement between said movable plate and said movable bracket;

third resilient means to bias said second latch member toward the first position;

second cam means cooperable with said first-named cam means to position said first-named latch member in the locked position when said manual lever is released, to permit relative movement between said movable plate and said first-named latch member when said manual lever is moved to and from the predetermined angular position, and to permit movement of said first-named latch member toward the unlocked position and retain said movable plate in place when said manual lever is moved over the predetermined angular position; and third cam means for maintaining said second latch member in the first position when said manual lever is in its released position and moved to and from the predetermined angular position and for effecting movement of said second latch member toward the second position when said manual lever is moved over the predetermined angular position.

2. A fastening device for a tiltable steering assembly as claimed in claim 1, wherein said first-named cam means comprises a lateral pin fixed to the free end of said first-named latch member, and a cam slot formed in said manual lever to receive said lateral pin therein, said cam slot being in engagement with said lateral pin in such a way to move said first-named latch member toward the unlocked position in response to movement of said manual lever toward the predetermined angular position and to move said first-named latch member toward the locked position in response to release of said manual lever, and wherein said second cam means comprises a cam slot formed in said movable plate and partially overlapped with said first-named cam slot to receive said lateral pin therein, said second-named cam slot being in engagement with said lateral pin in such a way to position said first-named latch member in the locked position when said manual lever is released, to permit relative rotary movement between said movable plate and said first-named latch member when said manual lever is moved to and from the predetermined angular position, and to permit movement of said first-named latch member toward the unlocked position and retain said movable plate in place when said manual lever is moved over the predetermined angular position.

3. A fastening device for a tiltable steering assembly as claimed in claim 2, wherein said first-named cam slot in said manual lever is arranged to extend upwardly from said lateral pin in a direction apart from the pivot of said movable bracket when said first-named latch member is in the locked position, and wherein said second-named cam slot in said movable plate includes a first circumferentially extending cam slot portion defined about a center located at the pivot of said first-named latch member and a second circumferentially extending cam slot portion defined about a center located at the pivot of said movable bracket.

4. A fastening device for a tiltable steering assembly as claimed in claim 3, wherein said first-named cam slot in said manual lever includes an oblique slot portion arranged to extend upwardly from said lateral pin in a direction apart from the pivot of said movable bracket when said first-named latch member is in the locked position, and a circumferentially extending slot portion extending upwardly from said oblique slot portion and being defined about a center located at the pivot of said movable bracket.

5. A fastening device for a tiltable steering assembly as claimed in claim 1, wherein said third cam means comprises a lateral pin fixed to the free end of said second latch member, and a cam face formed at the lower end portion of said manual lever and arranged to be engaged with said lateral pin for effecting disengagement of said second latch member from the toothed portion of said movable bracket when said manual lever is moved over the predetermined angular position.

6. A fastening device for a tiltable steering assembly as claimed in claim 5, wherein said manual lever is formed at the lower end portion thereof with a cam groove which is arranged to provide said cam face engageable with said lateral pin and a stopper arm for receiving thereon said lateral pin when said second latch member is disengaged from the toothed portion of said movable bracket due to undesired vibration of said steering assembly.

7. A fastening device for a tiltable steering assembly as claimed in claim 1, wherein said movable plate is integrally formed at the lower portion thereof with a spring guide, and said third resilient means is in the form of a torsion spring mounted on said spring guide for biasing said second latch member toward the first position.

8. A fastening device for a tiltable steering assmebly including a steering shaft tiltably connected to steering gear means in an automotive vehicle, a tubular housing having said steering shaft journalled therein, and a steering wheel mounted on said steering shaft, said fastening device comprising:
- a stationary bracket mounted on a portion of the vehicle body structure and having a pair of opposing arms;
- a movable bracket secured to said tubular housing and having a pair of opposing arms pivoted to the pair of arms of said stationary bracket for permitting angular adjustment of said steering wheel, one of the arms of said movable bracket being integrally provided with a toothed portion;
- a latch member pivoted to a portion of said stationary bracket and movable between a locked position in which said latch member is in engagement with the toothed portion of said movable bracket to lock said steering wheel in a selected angular driving position and an unlocked position in which said latch member disengages from the toothed portion of said movable bracket to permit free movement for angular adjustment of said steering wheel, said latch member being integrally provided at a free end thereof with a lateral pin;
- a manual lever pivoted to said stationary bracket coaxially with said movable bracket to be moved perpendicularly with respect to the pivot axis from its released position toward a predetermined angular position, said manual lever being provided at the lower end portion thereof with a cam slot in which said lateral pin is located to move said latch member toward the unlocked position in response to movement of said manual lever toward the predetermined angular position and to move it toward the locked position in response to release of said manual lever, and said manual lever being further provided at the lower end portion thereof with a cam groove which is arranged to form a cam face;
- a roller pivoted to the lower end of said manual lever to be engaged with said latch member when said manual lever is released and to be disengaged from said latch member when said manual lever is moved toward the predetermined angular position;
- a first spring for biasing said manual lever toward its released position to engage said roller with said latch member for effecting movement of said latch member toward the locked position and maintaining it in the locked position;
- a second spring interconnected to said stationary and movable brackets to bias said steering wheel into a remote position upwardly with respect to the selected angular driving position;
- a movable plate pivoted to said stationary bracket coaxially with said movable bracket and being provided with a second cam slot which is partially overlapped with said first-named cam slot to receive said lateral pin therein, said second cam slot being in engagement with said lateral pin in such a way to position said latch member in the locked position when said manual lever is released, to permit relative movement between said movable plate and said latch member when said manual lever is moved to and from the predetermined angular position, and to permit movement of said latch member toward the unlocked position and retain said movable plate in place when said manual lever is moved over the predetermined angular position;
- a second latch member pivoted to said movable plate and movable between a first position in which said second latch member is in engagement with the toothed portion of said movable bracket to connect said movable plate with said movable bracket and a second position in which said second latch member disengages from the toothed portion of said movable bracket to permit relative movement between said movable plate and said movable bracket, said second latch member being integrally provided at a free end thereof with a second lateral pin which is arranged to be engaged with said cam face of said manual lever for effecting movement of said second latch member toward the first position when said manual lever is in its released position and moved to and from the predetermined angular position and for effecting movement of said second latch member toward the second position when said manual lever is moved over the predetermined angular position; and
- a third spring mounted on a portion of said movable plate to bias said second latch member toward the first position.

* * * * *